(12) United States Patent
Mezaki et al.

(10) Patent No.: US 12,451,512 B2
(45) Date of Patent: Oct. 21, 2025

(54) GLASS FRIT, CRYSTALLIZED GLASS, METHOD FOR PRODUCING CRYSTALLIZED GLASS, SOLID ELECTROLYTE, AND LITHIUM ION SECONDARY BATTERY

(71) Applicant: AGC Inc., Tokyo (JP)

(72) Inventors: Takeya Mezaki, Tokyo (JP); Noriyoshi Kayaba, Tokyo (JP); Tomohiro Sakai, Tokyo (JP)

(73) Assignee: AGC Inc., Tokyo (JP)

( * ) Notice: Subject to any disclaimer, the term of this patent is extended or adjusted under 35 U.S.C. 154(b) by 1191 days.

(21) Appl. No.: 17/241,298

(22) Filed: Apr. 27, 2021

(65) Prior Publication Data

US 2021/0249684 A1    Aug. 12, 2021

Related U.S. Application Data

(63) Continuation of application No. PCT/JP2019/039025, filed on Oct. 2, 2019.

(30) Foreign Application Priority Data

Oct. 31, 2018    (JP) .................. 2018-205242

(51) Int. Cl.
  *C03C 10/00*    (2006.01)
  *C03B 32/02*    (2006.01)
  (Continued)

(52) U.S. Cl.
  CPC ......... *H01M 10/0562* (2013.01); *C03B 32/02* (2013.01); *C03C 8/06* (2013.01);
  (Continued)

(58) Field of Classification Search
  CPC ......... H01M 10/0562; H01M 10/0525; H01M 2300/008; C03B 32/02; C03B 27/012;
  (Continued)

(56) References Cited

U.S. PATENT DOCUMENTS

| 4,184,015 A  * | 1/1980 | Reau ........................ C03C 4/18 |
| | | 429/322 |
| 2015/0210919 A1* | 7/2015 | Won ................... H10H 20/8511 |
| | | 501/24 |

(Continued)

FOREIGN PATENT DOCUMENTS

| FR | 2 387 192 A1 | 11/1978 |
| JP | 2006-222047 A | 8/2006 |

(Continued)

OTHER PUBLICATIONS

Extended European Search Report issued Jul. 12, 2022 in European Application No. 19878115, 12 pages.

(Continued)

*Primary Examiner* — Christian Roldan
(74) *Attorney, Agent, or Firm* — Oblon, McClelland, Maier & Neustadt, L.L.P.

(57) ABSTRACT

A glass frit includes a glass which contains: Li; at least one selected from the group consisting of B, Si, P, Ge, and Te; O; and at least one selected from the group consisting of F, Cl, Br, and I. The glass is to turn into a crystallized glass (Continued)

including an amorphous phase and a crystalline phase, the crystalline phase precipitated by a heat treatment at a temperature equal to or higher than a glass transition temperature and equal to or lower than a glass crystallization temperature. The crystallized glass shows diffraction peaks at $2\theta=22.8\pm0.5°$, $2\theta=32.1\pm0.5°$ and $2\theta=39.6\pm0.5°$ in a powder X-ray diffraction pattern using Cu-K$\alpha$ radiation.

20 Claims, 1 Drawing Sheet

(51) Int. Cl.
  *C03C 8/06* (2006.01)
  *C03C 10/16* (2006.01)
  *H01M 10/0525* (2010.01)
  *H01M 10/0562* (2010.01)
  *H01B 1/06* (2006.01)

(52) U.S. Cl.
  CPC .......... *C03C 10/0054* (2013.01); *C03C 10/16* (2013.01); *H01M 10/0525* (2013.01); *C03C 2204/00* (2013.01); *C03C 2205/00* (2013.01); *H01B 1/06* (2013.01); *H01M 2300/008* (2013.01); *H01M 2300/0091* (2013.01)

(58) Field of Classification Search
  CPC ....... C03C 8/06; C03C 10/16; C03C 2204/00; H01B 1/08
  See application file for complete search history.

(56) References Cited

U.S. PATENT DOCUMENTS

| | | |
|---|---|---|
| 2018/0127280 A1 | 5/2018 | Goodenough et al. |
| 2019/0177207 A1 | 6/2019 | Ishioka et al. |

FOREIGN PATENT DOCUMENTS

| | | | |
|---|---|---|---|
| JP | 5825077 B2 | | 12/2015 |
| JP | 2017137226 A | * | 8/2017 |
| WO | WO 2018/034271 A1 | | 2/2018 |

OTHER PUBLICATIONS

Tsai, P. P., et al., "Lithium ion conducting glasses in the system LiCl—Li$_2$O—P$_2$O$_5$—SiO$_2$", Journal of Noncrystalline Solids, North-Holland Physics Publishing.Amsterdam, NL,vol. 103, No. 1,Jun. 2, 1988 (Jun. 2, 1988), pp. 101-107.

Kraevskii, S.L., et al., "Radiation-Induced Formation of Color Centers and Cl$_2$ Molecules in Phosphate and Halide-Containing Phosphate Glasses", Soviet Journal of Glass Physics and Chemistry, Fizika I Chimija Stekla, Maik Nauka/Interperiodica Publ., vol. 23, No. 1,Jan. 1, 1997 (Jan. 1, 1997), pp. 74-79.

Rojo, J. H., et al., "Relationship between Microstructure and ionic Conduction properties of oxyfluoride Tellurite Glass—Ceramics", Journal of Noncrystalline Solids, North-Holland Physics Publishing, Amsterdam, NL, vol. 146, No. 1, Aug. 2, 1992, pp. 50-56.

Horiuchi M., et al., "Preparation and properties of superionic conducting glasses containing lithium halide", Journal of Non-Crystalline Solids, North-Holland Physics Publishing, Amsterdam, NL, vol. 177, Nov. 2, 1994 (Nov. 2, 1994), pp. 236-241.

International Search Report issued Dec. 10, 2019 in PCT/JP2019/039025 filed on Oct. 2, 2019, 1 page.

* cited by examiner

GLASS FRIT, CRYSTALLIZED GLASS, METHOD FOR PRODUCING CRYSTALLIZED GLASS, SOLID ELECTROLYTE, AND LITHIUM ION SECONDARY BATTERY

TECHNICAL FIELD

The present invention relates to a glass frit used for a lithium ion secondary battery, etc., a crystallized glass, a production method of a crystallized glass, a solid electrolyte including a crystallized glass, and a lithium ion secondary battery having a solid electrolyte.

BACKGROUND ART

A lithium ion secondary battery is used as a compact and high-capacity driving power source in various fields such as automobiles, personal computers and mobile phones.

Conventionally, an organic solvent-based liquid electrolyte such as ethylene carbonate, diethyl carbonate and ethyl methyl carbonate has been used as the electrolyte for lithium ion secondary batteries. However, these organic solvent-based liquid electrolytes are flammable and may ignite. In addition, the organic solvent-based liquid electrolyte is disadvantageously susceptible to decomposition or alteration when a high voltage is applied.

Then, an inorganic solid electrolyte that is inflammable and has high stability against voltage application is expected as the electrolyte for next-generation lithium ion secondary batteries. As for the inorganic solid electrolyte, a solid electrolyte composed of a glass or a crystallized glass (sometimes referred to as glass-ceramic) has been proposed.

For example, Patent Literature 1 describes a technique where a sulfide-based glass-ceramic containing lithium atom and sulfur atom, which is a glass-ceramic having a specific peak in the Raman spectrum and XRD spectrum, is used as the solid electrolyte for secondary batteries. However, the glass-ceramic described in Patent Literature 1 is associated with a problem of generation of toxic $H_2S$ gas or low conformability to the electrode surface at the interface with an electrode, though high ion conductivity is obtained.

Patent Literature 2 describes a technique in which a crystallized glass is formed from an oxide not generating a toxic gas such as $H_2S$ and used for the solid electrolyte. However, the crystal glass described in Patent Literature 2 is insufficient in terms of ion conductivity, though the safety is high.

Patent Literature 3 describes a technique regarding a solid ion conductor formed from an oxide glass, and $Li_{2.9}Ba_{0.005}ClO$ crystal is described as a raw material of the oxide glass. In the oxide glass obtained by Patent Literature 3, a large amount of impurities containing hydroxide ions with low ion conductivity are mixed and hinder the charge/discharge. Also, the glass produced based on crystals does not exhibit flowability, and this is disadvantageous to the interface formation with an electrode.

CITATION LIST

Patent Literature

Patent Literature 1: Japanese Patent No. 5,825,077
Patent Literature 2: JP-A-2006-222047
Patent Literature 3: U.S. Patent Application Publication 2018/0127280

SUMMARY OF INVENTION

Technical Problem

The prevent invention has been made from these aspects, and an object thereof is to provide a glass frit, a crystallized glass, and a method for producing the crystallized glass, ensuring that a safe solid electrolyte achieving high ion conductivity, for example, achieving sufficiently practical ion conductivity for in-vehicle use, and exhibiting excellent conformability to the electrode surface can be formed. Another object of the present invention is to provide a safe solid electrolyte with high ion conductivity and a safe and high-performance lithium ion secondary battery using the solid electrolyte.

Solution to Problem

The present invention provides a glass frit, a crystallized glass, a production method of a crystallized glass, a solid electrolyte, and a lithium ion secondary battery, having the following configurations.

[1] A glass frit including a glass which contains:
  Li,
  at least one selected from the group consisting of B, Si, P, Ge, and Te,
  O, and
  at least one selected from the group consisting of F, Cl, Br, and I,
  wherein the glass is to turn into a crystallized glass including an amorphous phase and a crystalline phase, the crystalline phase precipitated by a heat treatment at a temperature equal to or higher than a glass transition temperature and equal to or lower than a glass crystallization temperature, and
  the crystallized glass shows diffraction peaks at $2\theta=22.8\pm0.5°$, $2\theta=32.1\pm0.5°$ and $2\theta=39.6\pm0.5°$ in a powder X-ray diffraction pattern using Cu-K$\alpha$ radiation.

[2] The glass frit according to [1], wherein in the powder X-ray diffraction pattern, the intensity of a diffraction peak attributed to (111) plane of LiX, in which X is at least one selected from the group consisting of F, Cl, Br and I, is 5 times or less an intensity of the diffraction peak having the highest intensity among those three diffraction peaks.

[3] The glass frit according to [1] or [2], wherein the crystalline phase has an anti perovskite structure.

[4] The glass frit according to any one of [1] to [3], wherein the crystalline phase contains $Li_3OX$, in which X is at least one selected from the group consisting of F, Cl, Br and I.

[5] The glass frit according to any one of [1] to [4], wherein the glass contains, as represented by cation %,
  50% or more and 75% or less of $Li^+$ and
  25% or more and 50% or less of at least one selected from the group consisting of $B^{3+}$, $Si^{4+}$, $P^{5+}$, $Ge^{4+}$ and $Te^{4+}$, and
  contains, as represented by anion %,
  70% or more and 92% or less of $O^{2-}$ and
  8% or more and 30% or less of at least one selected from the group consisting of $F^-$, $Cl^-$, $Br^-$ and $I^-$.

[6] The glass frit according to any one of [1] to [5], wherein the glass further contains at least one selected from the group consisting of Mg, Ca, Sr and Ba, and wherein the crystalline phase contains $Li_3OX$ and/or $Li_{3-2y}M_yOX$, in which X is at least one selected from the group consisting of F, Cl, Br and I, M is at least one selected from the group consisting of Mg, Ca, Sr and Ba, and y is a positive number being 0.001 or more and 0.02 or less.

[7] The glass frit according to [6], wherein a content of the at least one selected from the group consisting of Mg, Ca, Sr and Ba in the glass is, as represented by cation %, 0.0005% or more and 0.02% or less.

[8] The glass frit according to any one of [1] to [7], wherein denoting as $D_{50}$ the 50% particle diameter on a volume basis in a cumulative particle size distribution, $D_{50}$ of the glass frit is 0.01 μm or more and 20 μm or less.

[9] A crystallized glass including an amorphous phase and a crystalline phase,
  containing Li, at least one selected from the group consisting of B, Si, P, Ge and Te, O, and at least one selected from the group consisting of F, Cl, Br and I, and
  showing diffraction peaks at 2θ=22.8±0.5°, 2θ=32.1±0.5° and 2θ=39.6±0.5° in a powder X-ray diffraction pattern using Cu-Kα radiation.

[10] The crystallized glass according to [9], wherein in the powder X-ray diffraction pattern, an intensity of a diffraction peak attributed to (111) plane of LiX, in which X is at least one selected from the group consisting of F, Cl, Br and I, is 5 times or less an intensity of the diffraction peak having the highest intensity among those three diffraction peaks.

[11] The crystallized glass according to [9] or [10], wherein the crystalline phase has an anti perovskite structure.

[12] The crystallized glass according to any one of [9] to [11], wherein the crystalline phase contains $Li_3OX$, in which X is at least one selected from the group consisting of F, Cl, Br and I.

[13] The crystallized glass according to any one of [9] to [12], wherein a volume fraction of the crystalline phase in the crystallized glass is 10 vol % or more and 95 vol % or less.

[14] The crystallized glass according to any one of [9] to [13], containing, as represented by cation %,
  50% or more and 75% or less of $Li^+$ and
  25% or more and 50% or less of at least one selected from the group consisting of $B^{3+}$, $Si^{4+}$, $P^{5+}$, $Ge^{4+}$ and $Te^{4+}$,
  and containing, in anion %,
  70% or more and 92% or less of $O^{2-}$ and
  8% or more and 30% or less of at least one selected from the group consisting of $F^-$, $Cl^-$, $Br^-$ and $I^-$.

[15] The crystallized glass according to any one of [9] to [14], further containing at least one selected from the group consisting of Mg, Ca, Sr and Ba, wherein the crystalline phase contains $Li_3OX$ and/or $Li_{3-2y}M_yOX$, in which X is at least one selected from the group consisting of F, Cl, Br and I, M is at least one selected from the group consisting of Mg, Ca, Sr and Ba, and y is a positive number being 0.001 or more and 0.02 or less.

[16] The crystallized glass according to [15], wherein a content of the at least one selected from the group consisting of Mg, Ca, Sr and Ba is, as represented by cation %, 0.0005% or more and 0.02% or less.

[17] The crystallized glass according to any one of [9] to [16], wherein the crystallized glass is in frit form, and denoting as $D_{50}$ the 50% particle diameter on a volume basis in a cumulative particle size distribution, $D_{50}$ of the crystallized glass is 0.01 μm or more and 20 μm or less.

[18] A method for producing the crystallized glass according to any one of [9] to [17], including
  a step of dissolving a raw material composition containing components that the crystallized glass contains, at a temperature of 800° C. or more and 1,100° C. or less, followed by rapidly cooling to obtain a crystallized glass precursor, and
  a step of heat-treating the crystallized glass precursor in an inert gas atmosphere or dry atmosphere at a temperature of 200° C. or more and 500° C. or less for 5 minutes or more and 2 hours or less.

[19] The production method of the crystallized glass according to [18], wherein the inert gas is at least one selected from the group consisting of nitrogen, argon and helium, and wherein an oxygen concentration in the dry atmosphere is 0.1 vol % or more and 100 vol % or less.

[20] The production method of the crystallized glass according to [18] or [19], wherein the raw material composition and/or the crystallized glass precursor contain a seed crystal.

[21] The production method of the crystallized glass according to [20], wherein the seed crystal has an anti perovskite structure.

[22] The production method of the crystallized glass according to [20] or [21], wherein the seed crystal contains $Li_3OX$, wherein X is at least one selected from the group consisting of F, Cl, Br and I.

[23] A solid electrolyte including the crystallized glass according to any one of [9] to [17].

[24] A lithium ion secondary battery having a positive electrode, a negative electrode, and a solid electrolyte layer disposed between the positive electrode and the negative electrode, wherein the solid electrolyte layer includes the solid electrolyte according to [23].

Advantageous Effects of Invention

According to the present invention, a glass frit, a crystallized glass, and a method for producing the crystallized glass, enabling the formation of a safe solid electrolyte which achieves high ion conductivity, for example, achieves sufficiently practical ion conductivity for in-vehicle use, and exhibits excellent conformability to the electrode surface, can be provided. Furthermore, a safe solid electrolyte with high ion conductivity and a safe and high-performance lithium ion secondary battery using the solid electrolyte can be provided.

DESCRIPTION OF EMBODIMENTS

The embodiments of the present invention are described below.

In the present description, the "cation %" and "anion %" of the glass are units defined as follows. First, the constituent components of glass are separated into cation components and anion components. The "cation %" is a unit representing the content of each cation component by percentage (mol %), assuming the total content of all cation components contained in the glass is 100 mol %. The "anion %" is a unit representing the content of each anion component by percentage (mol %), assuming the total content of all anion components contained in the glass is 100 mol %. In the present description, unless otherwise indicated, "%" representing the content of a glass component is mol % as represented by cation % or anion % notation.

The content of each cation component in the glass can be determined from the results of inductively coupled plasma (ICP-AES: Inductively Coupled Plasma-Atomic Emission Spectroscopy) analysis of the obtained glass. In addition, the content of each anion component is determined from the results of silica tube combustion ion chromatography.

The valence of cation or anion in the glass may undergo a valence change depending on the condition. The valence in ionic notation of the cation or anion element symbol described in the present invention is represented by the valence that the ion can typically take.

In the present description, the glass transition temperature and the glass crystallization temperature are sometimes referred to as "Tg" and "Tc", respectively. Tg and Tc can be determined using an inflection point, a peak, etc. of a DTA curve showing exothermic-endothermic amounts and being obtained by differential thermal analysis (DTA) of a glass serving as a sample.

In the present description, the numerical range indicated using "to" means to include the numerical values before and after "to" as the lower limit value and the upper limit value.

[Glass Frit]

The glass frit of the present invention (hereinafter, sometimes referred to as "present glass frit") is composed of a glass satisfying the following (1) to (3) (hereinafter, sometimes referred to as "glass A").

(1) The glass A contains Li, at least one selected from the group consisting of B, Si, P, Ge and Te, O, and at least one selected from the group consisting of F, Cl, Br and I.

(2) In the glass A, a crystalline phase precipitates by a heat treatment at a temperature equal to or higher than a glass transition temperature and equal to or lower than a glass crystallization temperature, and the glass A turns into a crystallized glass including an amorphous phase and the crystalline phase (hereinafter, sometimes referred to as "crystallized glass B").

(3) The crystallized glass B shows diffraction peaks at $2\theta=22.8\pm0.5°$, $2\theta=32.1\pm0.5°$ and $2\theta=39.6\pm0.5°$ in a powder X-ray diffraction pattern using Cu-Kα radiation.

In the present glass frit, when the glass A satisfies (1) to (3), a solid electrolyte obtained using the present glass frit is safe, achieves high ion conductivity, and exhibits excellent conformability to the electrode surface.

At the time of forming a solid electrolyte using the present glass frit, the present glass frit composed of the glass A is usually heat-treated under the conditions of (2) to provide the crystallized glass B having the characteristics of (3), in which a crystalline phase is precipitated. Accordingly, a solid electrolyte obtained using the present glass frit usually contains the crystallized glass B. In the crystallized glass B, the components take the configuration of (1), allowing for safety; the crystalline phase has the characteristics of (3), achieving high ion conductivity; and the crystallized glass B has an amorphous phase together with the crystalline phase, leading to excellent conformability to the electrode surface. Also, in the crystallized glass B, the amorphous phase itself is ion-conducting as well, and this is advantageous to the interface formation with an electrode. In addition, the crystalline phase of the crystallized glass B is free of an impurity phase having hydroxide ions and therefore, does not hinder the charge/discharge. Furthermore, the amorphous phase of the crystallized glass B exhibits flowability, and this is advantageous to the interface formation with an electrode.

The crystalline phase possessed by the crystallized glass B preferably has an anti perovskite structure and preferably contains $Li_3OX$ (wherein X is at least one selected from the group consisting of F, Cl, Br and I). $Li_3OX$ is preferably $Li_3OCl$. Whether the crystalline phase has an anti perovskite structure can be confirmed by powder X-ray diffraction pattern. Whether the crystalline phase contains $Li_3OX$ can be confirmed by energy dispersive X-ray analysis.

(Glass A)

The glass A contains the components in (1) as essential components. In the glass A, Li and at least one selected from the group consisting of B, Si, P, Ge, and Te are cation components. O and at least one selected from the group consisting of F, Cl, Br, and I are anion components.

The glass A contains, as represented by cation %, 50% or more and 75% or less of $Li^+$ and 25% or more and 50% or less of at least one selected from the group consisting of $B^{3+}$, $Si^{4+}$, $P^{5+}$, $Ge^{4+}$ and $Te^{4+}$, and contains, as represented by anion %, 70% or more and 92% or less of $O^{2-}$ and 8% or more and 30% or less of at least one selected from the group consisting of $F^-$, $Cl^-$, $Br^-$ and $I^-$.

Each component contained in the glass A is described for the cation components and for the anion components.

<Cation Components>

The glass A contains Li, whereby the crystallized glass B obtained has ion conductivity. The content of $Li^+$ in the cation components is, as represented by cation %, preferably 50% or more and 75% or less. When the content of $Li^+$ is 50% or more, high electrical conductivity can be realized. When the content is 75% or less, the stability as a glass is likely to be maintained. The content of $Li^+$ is more preferably 53% or more and 72% or less, still more preferably 55% or more and 70% or less.

At least one selected from the group consisting of B, Si, P, Ge, and Te (hereinafter, sometimes referred to as "cation component NT"), which the glass A contains as the cation component, is a component forming the network of the glass. In the glass A, one of B, Si, P, Ge, and Te may be contained alone, or two or more thereof may be contained in combination. Among these, B, Si and P are preferred, and from the viewpoint that the conductivity is more increased, B is particularly preferred.

B, Si, P, Ge, and Te are, as a cation, typically represented by $B^{3+}$, $Si^{4+}$, $P^{5+}$, $Ge^{4+}$ and $Te^{4+}$, respectively. The content of at least one selected from the group consisting of $B^{3+}$, $Si^{4+}$, $P^{5+}$, $Ge^{4+}$ and $Te^{4+}$ (hereinafter, sometimes referred to as "cation NT") in the cation components of the glass A is, as represented by cation %, preferably 25% or more and 50% or less. When the content of the cation NT is 25% or more, the stability as a glass is likely to be maintained. When the content is 50% or less, high electrical conductivity can be realized. The content of the cation NT is more preferably 30% or more and 48% or less, still more preferably 33% or more and 46% or less.

In the glass A, the cation component may contain only Li and the cation component NT or may contain, if desired, other cation components. The other cation component is preferably at least one selected from the group consisting of Mg, Ca, Sr and Ba (hereinafter, sometimes referred to as "cation component M"). The cation component M is a Group 2 element, and the valence is typically 2+. In the glass A, one of Mg, Ca, Sr and Ba may be contained alone, or two or more thereof may be contained in combination. Among these, Ca and Ba are preferred, and from the viewpoint that the conductivity is high, Ba is particularly preferred.

In the case where the glass A contains the cation component M, the crystalline phase of the crystallized glass B obtained contains $Li_3OX$ and/or $Li_{3-2y}M_yOX$ (wherein X is at least one selected from the group consisting of F, Cl, Br and I, M is at least one selected from the group consisting of Mg, Ca, Sr and Ba, and y is a positive number of 0.001 or more and 0.02 or less). Whether the crystalline phase contains $Li_{3-2y}M_yOX$ can be confirmed by powder X-ray diffraction pattern. When the crystalline phase contains $Li_{3-2y}M_yOX$, this is advantageous in that the conductivity is higher. X in $Li_{3-2y}M_yOX$ is preferably Cl. y is more preferably 0.002 or more and 0.01 or less.

In the case where the glass A contains the cation component M, the content of at least one selected from the group consisting of $Mg^{2+}$, $Ca^{2+}$, $Sr^{2+}$ and $Ba^{2+}$ (hereinafter, sometimes referred to as "cation M") is, as represented by cation %, preferably 0.0005% or more and 0.02% or less. When the content of the cation M is 0.0005% or more, the conductivity is readily enhanced. When the content is 0.02% or less, the reduction in conductivity resulting from an excessive addition of the cation M is likely to be suppressed. The content of the cation M is more preferably 0.002% or more and 0.01% or less, still more preferably 0.003% or more and 0.005% or less.

The glass A may contain, as other cation components, still another cation component besides the cation component M within a range not impairing the effects of the present invention. The cation that can be contained include, specifically, $Mo^{6+}$, $W^{6+}$, $Fe^{2+}$, $Fe^{3+}$, $Sc^{3+}$, $Y^{3+}$, $La^{3+}$, $Ce^{3+}$, $Ce^{4+}$, $Gd^{3+}$, $Ti^{4+}$, $Zr^{4+}$, $V^{5+}$, $Nb^{5+}$, $Ta^{5+}$, $Cr^{3+}$, $Mn^{2+}$, $Mn^{3+}$, $Mn^{4+}$, $Co^{2+}$, $Co^{3+}$, $Ni^{2+}$, $Ni^{3+}$, $Cu^{2+}$, $Zn^{2+}$, $Al^{3+}$, $Ga^{3+}$, $In^{3+}$, $Sn^{2+}$, $Sn^{4+}$, $Sb^{3+}$, $Sb^{5+}$, $Bi^{3+}$, etc. Out of other cation components, the content of the cation component excluding the cation component M is, as represented by cation %, preferably 1% or less, more preferably 0.1% or less, still more preferably 0.01% or less.

<Anion Component>

The glass A contains, as the anion component, O and at least one selected from the group consisting of F, Cl, Br and I (hereinafter, sometimes referred to as "anion component X"). When the anion component contains O and the anion component X, it is possible for the crystalline phase in the crystallized glass B to contain $Li_3OX$ (wherein X is at least one selected from the group consisting of F, Cl, Br and I) as a preferable component. Furthermore, when the cation component contains the cation component M, it is possible for the crystalline phase in the crystallized glass B to contain $Li_{3-2y}M_yOX$ (wherein X is at least one selected from the group consisting of F, Cl, Br and I, M is at least one selected from the group consisting of Mg, Ca, Sr and Ba, and y is a positive number of 0.001 or more and 0.02 or less) as a preferable component.

The content of $O^{2-}$ in the anion components is, as represented by anion %, preferably 70% or more and 92% or less, and the content of the at least one selected from the group consisting of $F^-$, $Cl^-$, $Br^-$ and $I^-$ (hereinafter, sometimes referred to as "anion X") is, as represented by anion %, preferably 8% or more and 30% or less. The content of $O^{2-}$ is more preferably 72% or more and 90% or less, and the content of the anion X is more preferably 10% or more and 28% or less. The content of $O^{2-}$ is still more preferably 75% or more and 88% or less, and the content of the anion X is still more preferably 12% or more and 25% or less.

When the content of $O^{2-}$ in the anion components is 70% or more and the content of the anion X is 30% or less, it is easy for the glass A to maintain the stability as a glass. When the content of $O^{2-}$ in the anion components is 92% or less and the content of the anion X is 8% or more, a mixed anion effect of $O^{2-}$ and the anion X is obtained.

The mixed anion effect is, for example, an effect of making it possible to reduce the activation energy relating to Li ion movement and achieve a high ion conductivity. From the viewpoint that a high mixed anion effect is obtained, the anion X preferably contains $Cl^-$ and Br, more preferably $Cl^-$, and it is particularly preferred that the anion X contains only $Cl^-$.

In the glass A, the anion component may contain only 0 and the anion component X or may contain other anion components as needed. Other anion components include $Se^{2-}$, $Te^{2-}$, $SO^{4-}$, etc. From the viewpoint of use as a solid electrolyte of a lithium ion secondary battery, the total content of other anion components is 5% or less as represented by anion %.

It is preferred that the anion component is substantially free of $S^{2-}$. The "substantially free of" means to not contain the component except for the amount that is inevitably contained. Specifically, the content of $S^{2-}$ is, as represented by anion %, preferably 1% or less, more preferably 0.1% or less, still more preferably 0.01% or less.

Specifically, the glass A is preferably a grass containing, as represented by cation %, 50% or more and 75% or less of $Li^+$, 25% or more and 50% or less of the cation NT, and 0.0005% or more and 0.02% or less of the cation M, containing, as represented by anion %, 70% or more and 92% or less of $O^{2-}$ and 8% or more and 30% or less of the anion X, preferably $Cl^-$ and/or $Br^-$, more preferably $Cl^-$, and being substantially free of $S^{2-}$. This glass is a glass which is safe in use and provides particularly excellent ion conductivity to the crystallized glass B formed.

The glass A is usually amorphous as described later. The glass A has the property of, when heat-treated at a temperature equal to or higher than Tg and equal to or lower than Tc of the glass, allowing for precipitation of a crystalline phase to give the crystallized glass B including an amorphous phase and the crystalline phase, in which the crystalline phase has the characteristics of (3).

Tg of the glass A is preferably from 200 to 400° C., more preferably from 220 to 380° C. As for Tc of the glass A, (Tc-Tg) preferably satisfies 55° C. or more, more preferably satisfies 58° C. or more.

In the case of using the present glass frit composed of the glass A as a solid electrolyte of a lithium ion secondary battery, the glass frit is usually heat-treated (fired) under the conditions where the crystallized glass B is obtained, for example, at a temperature equal to or higher than Tg and equal to or lower than Tc.

In the case of using the present glass frit as a solid electrolyte of a lithium ion secondary battery, as described later, the present glass frit and an electrode material are sometimes individually formed into pastes, stacked and fired in a batch to prepare a laminated unit of a lithium ion secondary battery. In this case, when Tg and Tc of the glass A are in the ranges above, while suppressing the reduction in performance of the lithium secondary battery due to a reaction between the glass A and the electrode material in the present glass frit, a crystallized glass B-containing solid electrolyte having high ion conductivity can be easily formed with good conformability to the electrode surface.

The requirements of (3) in the crystalline phase of the crystallized glass B obtained from the glass A are mandatory requirements for the present glass frit so as to enhance the ion conductivity when the crystallized glass B is used as a solid electrolyte in a lithium ion secondary battery.

More specifically, the crystallized glass B has diffraction peaks at $2\theta=22.8\pm0.5°$, $2\theta=32.1\pm0.5°$ and $2\theta=39.6\pm0.5°$ in a powder X-ray diffraction pattern using Cu-Kα radiation (hereinafter, simply referred to as "X-ray diffraction pattern"). Hereinafter, the diffraction peak present at $2\theta=22.8\pm0.5°$, the diffraction peak present at $2\theta=32.1\pm0.5°$, and the diffraction peak present at $2\theta=39.6\pm0.5°$ are sometimes referred to as "first diffraction peak", "second diffraction peak", and "third diffraction peak", respectively.

Furthermore, in the X-ray diffraction pattern of the crystallized glass B, the intensity of a diffraction peak attributed to (111) plane of LiX (wherein X is at least one selected from the group consisting of F, Cl, Br and I) (hereinafter, sometimes referred to as "LiX-derived diffraction peak") is preferably 5 times or less the intensity of a diffraction peak having the highest intensity among the first diffraction peak, the second diffraction peak, and the third diffraction peak. More specifically, denoting as "$I_{LiX}$" the intensity of the LiX-derived diffraction peak and as "$I_{max(1-3)}$" the intensity of a diffraction peak having the highest intensity among the first diffraction peak, the second diffraction peak, and the third diffraction peak, the X-ray diffraction pattern of the crystallized glass B preferably satisfies $I_{LiX}/I_{max(1-3)} \leq 5$.

For the reason that the amount of LiX inhibiting ionic conduction is small, $I_{LiX}/I_{max(1-3)}$ in the X-ray diffraction pattern of the crystallized glass B is preferably 3 or less, more preferably 1 or less, still more preferably 0.1 or less. The position of the diffraction peak attributed to (111) plane of LiX is $38.7\pm0.5°$ for LiF, $30.1\pm0.5°$ for LiCl, $28.1\pm0.5°$ for LiBr, and $25.6\pm0.5°$ for LiI.

In the X-ray diffraction pattern, the first to third diffraction peaks are peaks belonging to the anti perovskite structure. The X-ray diffraction pattern of the crystallized glass B preferably does not have diffraction peaks other than the first to third diffraction peaks. In the present description, stating that the X-ray diffraction pattern has a diffraction peak in a specific range indicates a case where a diffraction peak is recognized by integrated powder X-ray analysis software PDXL (produced by Rigaku Corporation) under the condition of a lattice constant tolerance of 3.0%, and stating that the X-ray diffraction pattern does not have a diffraction peak indicates a case where a diffraction peak is not recognized.

The crystallized glass B has a sufficiently high ion conductivity suitable for use as a solid electrolyte of a lithium ion secondary battery. The ion conductivity is preferably $7.0\times10^{-6}$ (S/cm) or more, more preferably $1.0\times10^{-5}$ (S/cm) or more, still more preferably $1.0\times10^{-4}$ (S/cm) or more.

In the present description, the ion conductivity is a value obtained by AC impedance measurement at room temperature (from 20° C. to 25° C.). That is, the ion conductivity is measured using a sample having formed on both surfaces thereof an electrode by an AC impedance method. Specifically, the ion conductivity is calculated from an arc diameter of the Niquist plot obtained by AC impedance measurement under measurement conditions of an applied voltage of 50 mV and a measurement frequency range of 1 Hz to 1 MHz.

The present glass frit is composed of the glass A and has a particulate form. The particle diameter of the present glass frit can be appropriately selected according to usage. As for the particle diameter of the glass frit of the present invention, denoting as $D_{50}$ the 50% particle diameter on a volume basis in the cumulative particle size distribution, $D_{50}$ is preferably 0.01 μm or more and 20 μm or less. When $D_{50}$ is 0.01 μm or more, handling as an electrolyte is facilitated, and when it is 20 μm or less, the electrolyte formed as a green sheet is less likely to crack. $D_{50}$ in the present glass frit is more preferably 0.05 μm or more and 10 μm or less, still more preferably 0.1 μm or more and 5 μm or less.

Here, in the present description, $D_{50}$ specifically represents a particle diameter when the cumulative amount of particles accounts for 50% on the volume basis in a cumulative particle size curve of particle diameter distribution measured using a laser diffraction/scattering particle size distribution measuring apparatus.

The present glass frit is not particularly limited in the manufacturing method. The glass frit can be manufactured, for example, by producing the glass A in a predetermined shape by the following method and crushing the glass.

First, a raw material composition is prepared. The raw materials are not particularly limited as long as they are raw materials used for the production of a normal oxide-based glass, and an oxide, a halide, a carbonate, etc. may be used. The raw material composition is prepared by appropriately adjusting the kinds and ratio of raw materials to satisfy the composition range above in the obtained glass A.

Next, the raw material composition is heated by a known method to obtain a melt. The temperature (melting temperature) at which heating and melting is performed is preferably 800° C. or more and 1,100° C. or less, more preferably 900° C. or more and 1,000° C. or less. The heating and melting time is preferably from 10 to 60 minutes, more preferably from 15 to 40 minutes.

After that, the melt is cooled and solidified, thereby obtaining the glass A in a predetermined shape. The cooling method is not particularly limited. A method of rapidly cooling the melt by a roll-out machine, a press machine or by dropping on a cooling liquid is preferred. The glass A having a predetermined shape such as block, plate, etc. is obtained according to the cooling method. It is preferred that the obtained glass A is completely amorphous, i.e., the volume ratio of the amorphous phase in the glass A is 100 vol % and the volume ratio of the crystalline phase is 0 vol %. However, the glass may include a crystalline phase as long as the effects of the present invention are not impaired.

The present glass frit is obtainable, for example, by crushing the glass A obtained in a predetermined shape as described above. Accordingly, the particle size of the glass frit can be adjusted by the crushing conditions. The method for crushing includes a rotary ball mill, a vibrating ball mill, a planetary mill, a jet mill, an attritor, a medium stirring mill (bead mill), jaw crusher, a roll crusher, etc.

In order to adjust the particle size of the glass frit, classification may be performed using a sieve, etc. as needed, in addition to the crushing of the glass A.

[Crystallized Glass]

The crystallized glass of the present invention (hereinafter, sometimes referred to as "present crystal glass") includes an amorphous phase and a crystalline phase and is characterized by satisfying the following requirements of (11) and (12):

(11) The crystallized glass contains Li, at least one selected from the group consisting of B, Si, P, Ge and Te, O, and at least one selected from the group consisting of F, Cl, Br and I; and (12) The crystallized glass shows diffraction peaks at $2\theta=22.8\pm0.5°$, $2\theta=32.1\pm0.5°$ and $2\theta=39.6\pm0.5°$ in a powder X-ray diffraction pattern using Cu-Kα radiation.

As with the crystallized glass B, the above-described three diffraction peaks in the X-ray diffraction pattern of the present crystallized glass are sometimes referred to as the first diffraction peak, the second diffraction peak, and the third diffraction peak. In the X-ray diffraction pattern of the present crystallized glass, as with the crystallized glass B, the intensity of a diffraction peak attributed to (111) plane of LiX (wherein X is at least one selected from the group consisting of F, Cl, Br and I) is preferably 5 times or less the intensity of a diffraction peak having the highest intensity among the first diffraction peak, the second diffraction peak, and the third diffraction peak.

More specifically, denoting as "$I_{LiX}$" the intensity of the LiX-derived diffraction peak and as "$I_{max(1-3)}$" the intensity of a diffraction peak having the highest intensity among the first diffraction peak, the second diffraction peak, and the third diffraction peak, the X-ray diffraction pattern of the present crystallized glass preferably satisfies $I_{LiX}/I_{max(1-3)} \leq 5$. For the reason that the amount of LiX inhibiting ionic conduction is small, $I_{LiX}/I_{max(1-3)}$ in the X-ray diffraction pattern of the present crystallized glass is preferably 3 or less, more preferably 1 or less, still more preferably 0.1 or less.

The present crystallized glass is a crystallized glass including an amorphous phase and a crystalline phase and satisfies the requirements of (11) and (12). Therefore, a solid electrolyte using the present crystallized glass is safe, achieves high ion conductivity, and exhibits excellent conformability to the electrode surface. Also, in the present crystallized glass, the amorphous phase itself is ion-conducting as well, and this is advantageous to the interface formation with an electrode. In addition, the crystalline phase of the present crystallized glass is free of an impurity phase having hydroxide ions and therefore, does not hinder the charge/discharge. Furthermore, the amorphous phase of the present crystallized glass exhibits flowability, and this is advantageous to the interface formation with an electrode.

The crystalline phase in the present crystallized glass preferably has an anti perovskite structure and preferably contains $Li_3OX$ (wherein X is at least one selected from the group consisting of F, Cl, Br and I). $Li_3OX$ is preferably $Li_3OCl$. Whether the crystalline phase has an anti perovskite structure and whether it contains $Li_3OX$ can be confirmed by the same methods as those for the crystalline phase in the crystallized glass B.

The crystallized glass B is a crystallized glass falling under the category of the present crystallized glass, and the requirements of (12) in the present crystallized glass are the same as the requirements of (3) in the crystallized glass B. As with the crystallized glass B, the X-ray diffraction pattern of the present crystallized glass preferably does not have diffraction peaks other than the first to third diffraction peaks.

It is preferred that the volume fraction of the crystalline phase in the present crystallized glass is 10 vol % or more and 95 vol % or less, and the volume fraction of the amorphous phase is 5 vol % or more and 90 vol % or less. When the volume fraction of the crystalline phase in the present crystallized glass is 10 vol % or more and the volume fraction of the amorphous phase is 90 vol % or less, a sufficiently high ion conductivity is obtained at the time of making a solid electrolyte. When the volume fraction of the crystalline phase in the present crystallized glass is 95 vol % or less and the volume fraction of the amorphous phase is 5 vol % or more, the conformability to the electrode surface at the time of making a solid electrolyte is more enhanced.

The volume fraction of the crystalline phase in the present crystallized glass is more preferably 15 vol % or more and 90 vol % or less, still more preferably 20 vol % or more and 90 vol % or less. The volume fraction of the amorphous phase in the present crystallized glass is more preferably 10 vol % or more and 85 vol % or less, still more preferably 10 vol % or more and 80 vol % or less.

The volume fractions of the crystalline phase and amorphous phase in the crystallized glass can be estimated from the microstructure of the crystallized glass observed with a scanning electron microscope. The volume fractions of the crystalline phase and amorphous phase in the crystallized glass can also be calculated from the composition of the present crystal glass, i.e., the average composition of the crystalline phase and the amorphous phase, for example, the composition of the later-described crystallized glass precursor.

The present crystallized glass contains the components given in (11) as essential components. In the present crystallized glass, the amorphous phase and the crystalline phase differ in the composition. Accordingly, these essential components may be present in only either one of the amorphous phase and the crystalline phase or may be present in both. For example, there may be adopted a configuration where Li, O and at least one selected from the group consisting of F, Cl, Br, and I are present in both the amorphous phase and the crystalline phase and at least one selected from the group consisting of B, Si, P, Ge, and Te is present only in the amorphous phase.

The components contained in the present crystallized glass are components that the entire crystallized glass made up by combining the amorphous phase and the crystalline phase contains, and the content of each component indicates the content in the entire crystallized glass obtained by averaging the contents in the amorphous phase and the crystalline phase. The components contained in the present crystallized glass and the contents thereof can, specifically, be the same as the components contained in the glass A and the contents thereof, including preferable ranges.

In the case where the present crystallized glass contains at least one selected from the group consisting of Mg, Ca, Sr and Ba, these components may be present in both the amorphous phase and the crystalline phase. In this case, the crystalline phase of the present crystallized glass contains $Li_3OX$ and/or $Li_{3-2y}M_yOX$ (wherein X is at least one selected from the group consisting of F, Cl, Br and I, M is at least one selected from the group consisting of Mg, Ca, Sr and Ba, and y is a positive number of 0.001 or more and 0.02 or less). Whether the crystalline phase contains $Li_{3-2y}M_yOX$ can be confirmed by the same method as that for the crystalline phase in the crystallized glass B. In the case where the crystalline phase contains $Li_{3-2y}M_yOX$, this is advantageous in that the conductivity is more enhanced. X in $Li_{3-2y}M_yOX$ is preferably Cl. y is more preferably 0.002 or more and 0.01 or less.

The present crystallized glass may take any form. The present crystallized glass may be, for example, in the form of a block, a plate, a thin plate 0) or a frit (particle) and is preferably in frit form.

In the case where the present crystallized glass is in frit form, the particle diameter thereof can be appropriately selected according to use. As for the particle diameter of the frit of the present crystallized glass, denoting as $D_{50}$ the 50% particle diameter on a volume basis in the cumulative particle size distribution, $D_{50}$ is preferably 0.01 μm or more and 20 μm or less. When $D_{50}$ is 0.01 μm or more, handling as an electrolyte is facilitated. When it is 20 μm or less, the electrolyte formed as a green sheet is less likely to crack. $D_{50}$ in the frit of the present crystallized glass is more preferably 0.05 μm or more and 10 μm or less, still more preferably 0.1 μm or more and 5 μm or less.

The present crystallized glass has a sufficiently high ion conductivity suitable for use as a solid electrolyte of a lithium ion secondary battery. The ion conductivity is preferably $7.0 \times 10^{-6}$ (S/cm) or more, more preferably $1.0 \times 10^{-5}$ (S/cm) or more, still more preferably $1.0 \times 10^{-4}$ (S/cm) or more.

[Production Method of Present Crystallized Glass]

The present crystallized glass can be produced, for example, by the production method of the present invention including the following steps of (I) and (II):

(I) a step of dissolving a raw material composition containing components that the present crystallized glass contains, at a temperature of 800° C. or more and 1,100° C. or less, followed by rapidly cooling to obtain a crystallized glass precursor (hereinafter, sometimes referred to as step (I)), and (II) a step of heat-treating the crystallized glass precursor obtained in (I) in an inert gas atmosphere or dry atmosphere at a temperature of 200° C. or more and 500° C. or less for 5 minutes or more and 2 hours or less (hereinafter, sometimes referred to as step (II)).

The crystallized glass precursor obtained in step (I) can be used, for example, as the glass A, and in this case, the step (I) can be the same as the above-described method for producing the glass A. However, in step (I), the cooling after dissolving the raw material composition in the production of the glass A is rapid cooling. The crystallized glass precursor may also be the present glass frit composed of the glass A.

In step (I), the crystallized glass precursor may be formed of one precursor or two or more precursors. In the case where the crystallized glass precursor is formed of two or more precursors, the components that the present crystallized glass contains is entirely contained in a mixture obtained by combining those precursors, and as for the content of each component, the content of each component relative to the entire mixture should coincide with the content of each component in the present crystallized glass obtained.

Also, in step (I), the raw material composition and/or the crystallized glass precursor may contain a seed crystal. The seed crystal preferably has, for example, an anti perovskite structure and preferably contains $Li_3OX$ (wherein X is at least one selected from the group consisting of F, Cl, Br and I). In the case where the present crystallized glass contains at least one selected from the group consisting of Mg, Ca, Sr and Ba, the seed crystal preferably contains $Li_3OX$ and/or $Li_{3-2y}M_yOX$ (wherein X is at least one selected from the group consisting of F, Cl, Br and I, M is at least one selected from the group consisting of Mg, Ca, Sr and Ba, and y is a positive number of 0.001 or more and 0.02 or less). $Li_3OX$ is preferably $Li_3OCl$. The content of the seed crystal in the raw material composition and/or the crystallized glass precursor is preferably from 0.001 to 60 mass %, more preferably from 0.01 to 20 mass %, still more preferably from 0.01 to 5 mass %, relative to the total amount of the raw material composition and/or the crystallized glass precursor.

In the case where the raw material composition and/or the crystallized glass precursor contains a seed crystal, the components that the present crystallized glass contains is contained in the raw material composition and/or crystallized glass precursor as a whole, inclusive of the seed crystal, and as for the content of each component, the content of each component relative to the whole of the raw material composition and/or crystallized precursor, inclusive of the seed crystal, should coincide with the content of each component in the present crystallized glass obtained.

The inert gas used in step (II) includes at least one selected from the group consisting of nitrogen, argon and helium. The dry atmosphere indicates an atmosphere having a dew point value of −50° C. or less. In the dry atmosphere, the oxygen concentration is preferably 0.1 vol % or more and 100 vol % or less. The gas component in the dry atmosphere other than oxygen includes nitrogen, argon, carbon dioxide, etc.

From the viewpoint of obtaining the amorphous phase and the crystalline phase at desired volume fractions, the conditions for the heat treatment in step (II) are a temperature of 200° C. or more and 500° C. or less and a time of 5 minutes or more and 2 hours or less, preferably a temperature of 250° C. or more and 480° C. or less and a time of 10 minutes or more and 1.5 hours or less, more preferably a temperature of 300° C. or more and 450° C. or less and a time of 15 minutes or more and 1 hour or less. The lower limit of the heat treatment temperature is preferably equal to or higher than Tg of the crystallized glass precursor, and the upper limit is preferably equal to or lower than Tc of the crystallized glass precursor.

In this way, the present crystallized glass having the same form as the form of the crystallized glass precursor obtained in step (I) is produced. In (II), when the present crystallized glass is in the form of a block, a plate, a thin plate (flake), etc., the crystallized glass is, if desired, crushed and thereby processed into a frit form. As for the crushing method, the same method as the crushing method at the time of processing the glass A into the present glass frit may be used.

The present crystallized glass has a sufficiently high ion conductivity as described above, as well as allows safety and good shapability due to having the amorphous phase, and, therefore, is useful as a solid electrolyte of a lithium ion secondary battery. Also, the solid electrolyte of the present invention is applicable to a solid electrolyte of a metal-air battery or an all-solid battery.

<Solid Electrolyte>

The solid electrolyte of the present invention includes the present crystallized glass. The solid electrolyte may contain, if desired, components other than the present crystallized glass, within a range not impairing the effects of the present invention. Other components that can be contained include a lithium ion-conducting crystal, etc. The content ratio of the present crystallized glass of the present invention in the solid electrolyte is preferably from 40 to 100 vol %, more preferably from 80 to 100 vol %, still more preferably 100 vol %.

In the case where the solid electrolyte of the present invention is formed in a predetermined form, for example, in a layered form as a solid electrolyte layer in a lithium ion secondary battery, when the solid electrolyte is formed of the present crystallized glass, for example, the crystallized glass precursor obtained in step (I) of the above-described production method of the present crystallized glass is shaped in a layered form and after that, step (II) of the production method of the present crystallized glass is performed to thereby obtain a solid electrolyte layer. In the case where the present crystallized glass is in frit form, for example, a frit composed of the present crystallized glass is shaped in a layered form and then fired to obtain a solid electrolyte layer.

In the case where the solid electrolyte contains other components in addition to the present crystallized glass, the crystallized glass precursor obtained in step (I) or the present crystallized glass is powder mixed with other components, and the mixture is shaped in a layered form and subjected to co-sintering, etc. to thereby obtain a solid electrolyte layer.

<Lithium Ion Secondary Battery>

The lithium ion secondary battery of the present invention is a lithium ion secondary battery having a positive electrode, a negative electrode, and a solid electrolyte layer formed of the solid electrolyte of the present invention and disposed between the positive electrode and the negative electrode. As long as the lithium ion secondary battery of the present invention has a laminated body in which a positive electrode and a negative electrode are disposed to sandwich a solid electrolyte layer formed of the solid electrolyte of the present invention, other configurations are not particularly limited. Taking the above-described laminated body as one unit (hereinafter, sometimes referred to as "laminate unit), the lithium ion secondary battery may have, according to the required battery performance, a configuration including one laminate unit or may have a configuration where two or more laminate units are stacked.

In the lithium ion secondary battery of the present invention, the solid electrolyte layer is formed of the solid electrolyte of the present invention, thereby allowing excellent shapability, and, for example, a lithium ion secondary battery having a laminated structure in which a plurality of laminate units above are stacked (hereinafter, sometimes referred to as "multilayer structure"), can easily be produced. In particular, a lithium ion secondary battery having a multilayer structure can be produced by the later-described batch firing, and since excellent adhesiveness between respective layers is consequently achieved, a lithium ion secondary battery having excellent battery performance or temporal stability is obtained.

Figure 1:
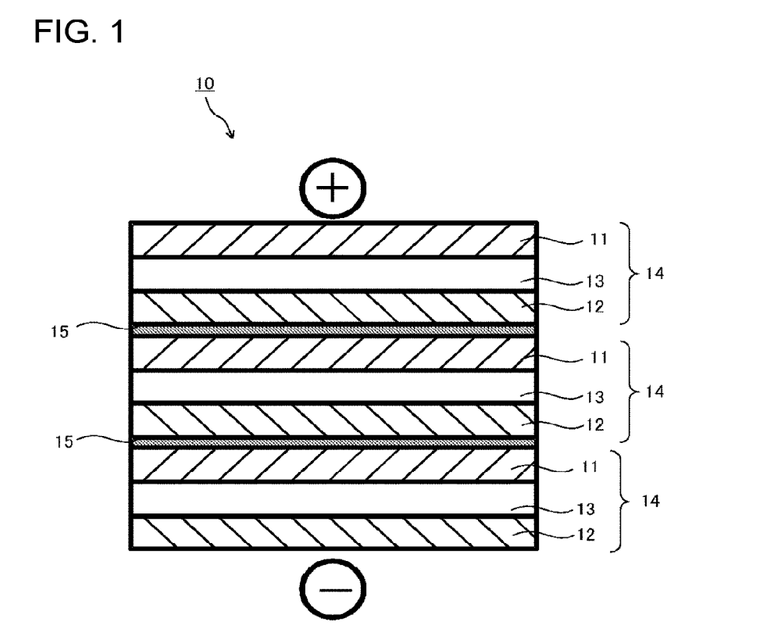
FIG. 1 is a diagram schematically illustrating the lithium ion secondary battery of the present invention.

In FIG. 1, a multilayer all-solid type and series-type lithium ion secondary battery is schematically illustrated as one example of the configuration of the lithium ion secondary battery.

As illustrated in FIG. 1, a lithium ion secondary battery 10 has a structure in which a plurality of laminate units 14 each having a positive electrode (cathode electrode) 11, a negative electrode (anode electrode) 12, and a solid electrolyte layer 13 arranged between the positive electrode 11 and the negative electrode 12 are stacked through an electron conductor layer 15 and connected in series. In FIG. 1, the signs "+" and "−" in circles indicate a positive electrode terminal and a negative electrode terminal, respectively.

For example, $LiCoO_2$, $LiMn_2O_4$, $LiFePO_4$, etc. is used for the positive electrode 11. For example, metallic lithium, graphite, $Li_4Ti_5O_{12}$, etc. is used for the negative electrode 12. However, these are only an example, and other electrode materials may be used for the positive electrode 11 and the negative electrode 12.

For the solid electrolyte layer 13, a solid electrolyte containing the present crystallized glass is used.

The electron conductor layer 15 is a layer made of an electron conductive material, for example, aluminum, copper nickel, silver, palladium, gold, platinum, etc., and has a function of connecting the plurality of laminate units 14 in series.

In the case where the lithium ion secondary battery of the present invention is a series-type and multilayer all-solid type lithium ion secondary battery illustrated in FIG. 1, the thickness of each layer and the number of laminate units are not particularly limited and are appropriately adjusted according to the design of the lithium ion secondary battery. In the case of forming the solid electrolyte layer from a solid electrolyte containing the present crystallized glass, a solid electrolyte layer having, for example, a uniform thickness down to 0.5 μm in terms of the lower limit of the thickness of the layer can be formed, although depending on the area thereof. As for the upper limit of the thickness of the solid electrolyte layer, a thickness roughly up to 1 mm is applicable.

In the series-type and multilayer all-solid type lithium ion secondary battery 10 illustrated in FIG. 1, the laminate unit 14 may have a layer other than those described above. Furthermore, the lithium ion secondary battery 10 may have a layer other than the laminate unit 14 and the electron conductor layer 15.

In the case of fabricating the multilayer all-solid type lithium ion secondary battery as a parallel type, this may be attained by, for example, in the series-type lithium ion secondary battery 10 illustrated in FIG. 1, changing the electron conductor layer 15 to an insulator layer, connecting en bloc respective positive electrodes 11 in respective laminate units 14 to a positive electrode terminal through a wiring (positive electrode wiring), and connecting en bloc respective negative electrodes 12 in respective laminate units 14 to a negative electrode terminal through a wiring (negative electrode wiring).

A lithium ion secondary battery in which the solid electrolyte layer is formed of a solid electrolyte containing the present crystallized glass is inflammable, allowing high safety, and has high stability against voltage application, comparing to a related-art battery in which an organic solvent-based liquid electrolyte is used. Also, the present crystallized glass contained in the solid electrolyte has high safety and high stability, and this facilitates the manufacture. In addition, the present crystallized glass has a sufficiently high ion conductivity and therefore, allows a good battery performance to be exhibited.

(Manufacturing Method of Lithium Ion Secondary Battery)

As the method for manufacturing the lithium ion secondary battery of the present invention, known manufacturing methods for a lithium ion secondary battery having a solid electrolyte layer can be applied without any particular limitation. In the present invention, a method not impairing the characteristics of (12) of the present crystallized glass used in the solid electrolyte layer is usually applied.

In the following, the manufacturing method is described taking, as an example, a multilayer all-solid type lithium ion secondary battery that is one example of the lithium ion secondary battery of the present invention illustrated in FIG. 1.

The lithium ion secondary battery 10 can be manufactured, for example, by separately producing respective layers constituting the battery, i.e., positive electrode 11, negative electrode 12, solid electrolyte layer 13 and electron conductor layer 15, stacking the layers in the order illustrated in FIG. 1, and integrating the stack by heating/pressure-bonding, etc.

The lithium ion secondary battery 10 can also be manufactured, for example, by forming respective pastes of a positive electrode active material constituting the positive electrode 11, a solid electrolyte constituting the solid electrolyte layer 13, a negative electrode active material constituting the negative electrode 12, and an electron conductive material constituting the electron conductor layer 15, applying and drying each paste to produce a green sheet, stacking these green sheets in the order illustrated in FIG. 1, and subjecting the stack to batch firing. In the case of intending to form a flat pattern, the green sheet above may be subjected to punching or cutting, or a method of applying the paste onto a base material by screen printing or gravure printing may also be employed. In the manufacturing method of the lithium ion secondary battery according to the present invention, application of batch firing is preferred.

Here, each of the positive electrode active material, negative electrode active material and electron conductive material used for paste formation may be a product prepared by calcining an inorganic salt, etc. that is a raw material of the material. In order that a chemical reaction of the raw material proceeds due to calcination and each material sufficiently brings out its function after batch firing, the calcination temperatures of the positive electrode active material, negative electrode active material and electron conductive material are all preferably 700° C. or more. After the calcination, each material is pulverized into a powder form by a ball mill, etc.

In the paste for the solid electrolyte layer, a solid electrolyte containing the present crystallized glass, or a crystallized glass precursor that turns into the present crystallized glass during firing, for example, the crystallized glass precursor obtained in step (I) of the production method of the present crystallized glass, is used. This is usually pulverized into a powder form before use, preferably pulverized to satisfy the $D_{50}$ range above specified for the case of processing the present crystallized glass into a frit form. The crystallized glass precursor used in a paste for the solid electrolyte layer is preferably the present glass frit.

The method for paste formation is not particularly limited, but a paste can be obtained, for example, by mixing each powder of the materials above in a vehicle. The vehicle as used herein is a collective term of mediums in a liquid phase. The vehicle contains a solvent and a binder. In this way, a paste for the positive electrode 11, a paste for the solid electrolyte layer 13, a paste for the negative electrode 12, and a paste for the electron conductor layer 15 are prepared.

Then, each paste prepared is applied onto a substrate such as PET (polyethylene terephthalate) and dried, if desired, and after that, the substrate is peeled off to produce each of green sheets for the positive electrode 11, for the solid electrolyte layer 13, for the negative electrode 12, and for the electron conductor layer 15. The method for applying the paste is not particularly limited, and a known method such as screen printing, transfer and doctor blade may be employed.

Respective green sheets prepared for the positive electrode 11, for the solid electrolyte layer 13, for the negative electrode 12, and for the electron conductor layer 15 are stacked in the order illustrated in FIG. 1, and alignment, cutting, etc. are performed as needed to prepare a laminated body. If desired, the green sheets may be stacked while performing alignment such that the end face of the positive electrode layer and the end face of the negative electrode layer do not coincide.

Subsequently, the laminated bodies produced are collectively pressure-bonded. The pressure bonding is performed under heating, and the heating temperature is, for example, from 40 to 80° C. The pressure-bonded laminated bodies are heated, for example, in an air atmosphere and thereby fired. As for the firing temperature, in the case where the green sheet for the solid electrolyte contains a crystallized glass precursor, the heat treatment conditions described in step (II) of the production method of the present crystallized glass are preferred. In this case, if the firing temperature is less than the lower limit in the heat treatment conditions, crystallization may not sufficiently proceed, and if it exceeds the upper limit, crystallization of the crystallized glass may be promoted than necessary, inhibiting the firing. In addition, if the temperature exceeds the upper limit in the heat treatment conditions, there may arise a problem, for example, a change in the structure of the positive electrode active material or the negative electrode active material, and this is disadvantageous.

In the case where the green sheet for the solid electrolyte contains the present crystallized glass, the firing temperature and time are preferably from 200 to 500° C. and from 5 minutes to 2 hours, more preferably from 250 to 480° C. and from 10 minutes to 1.5 hours. If the firing temperature is less than the lower limit above, firing may not sufficiently proceed, and if it exceeds the upper limit, there may disadvantageously arise a problem, for example, crystallization of the crystallized glass is promoted than necessary, resulting in inhibiting the firing, or the structure of the positive electrode active material or the negative electrode active material is changed.

In manufacturing the lithium ion secondary battery 10 having a multilayer structure by the above-described batch firing, a method where with respect to the laminate unit 14 consisting of the positive electrode 11, the solid electrolyte layer 13 and the negative electrode 12, each individual unit is fired in a batch in the same manner as above and the obtained laminate units 14 are stacked through the electron conductor layer 15 paste and fired according to the firing conditions of the electron conductor layer 15 paste, may also be employed.

In the present invention, batch firing is performed as described above, and consequently, in the case where the green sheet for the solid electrolyte contains a crystallized glass precursor, a lithium ion secondary battery having a multilayer structure in which respective layers of the multilayer structure, i.e., the positive electrode, the negative electrode, the electron conductor layer, etc., are sufficiently fired while forming a solid electrolyte layer containing the present crystallized glass, is obtained. Also, in the case where the green sheet for the solid electrolyte contains the present crystallized glass precursor, a lithium ion secondary battery having a multilayer structure in which respective layers of the multilayer structure, i.e., the positive electrode, the solid electrolyte layer, the negative electrode, the electron conductor layer, etc., are sufficiently fired, is obtained by performing the batch firing. When the batch firing is performed, a lithium ion secondary battery achieving excellent adhesiveness between respective layers and having excellent battery performance, temporal stability and safety can be fabricated.

The present invention is specifically described below by referring to Examples, but the present invention is not limited to these Examples. Ex. 1 is Example of the glass frit, Exs. 2 and 3 are Comparative Examples of the glass frit, Ex. 4 is Example of the crystallized glass, and Exs. 5 and 6 are Comparative Examples of the crystallized glass.

Exs. 1 to 3

Respective raw material powders were weighed to have a charge composition shown in Table 1 and mixed. As the raw material, $B_2O_3$, $Li_2O$, $Li_2CO_3$, and LiCl were used in combination. Then, the mixed raw materials were put in a platinum crucible and heated at 800° C. to 1,100° C. for 10 to 60 minutes to melt the raw materials, and the melted raw materials were rapidly cooled with a roll-out machine to prepare a flaky (flaked) glass (hereinafter referred to as glass flake). The glass flake obtained was observed with a microscope, as a result, no crystal substance was found in all of the glass flakes.

The glass flake obtained was pulverized using an alumina mortar and then sieved with a mesh having an opening of 150 μm to prepare a glass frit. Hereinafter, the glass frit of Ex. 1 is referred to as glass frit 1. The same applies to other Exs.

(Physical Properties of Glass Frit)

(1) $D_{50}$

With respect to the glass frit of each Ex. obtained above, $D_{50}$ was measured using a particle size distribution measuring apparatus (trade name: Microtrac MT3000EXII, manufactured by Nikkiso Co., Ltd.).

(2) Tg and Tc

With respect to the glass frit of each Ex. obtained above, DTA measurement was performed using a differential thermal analyzer (trade name: TG8110, manufactured by Rigaku Corporation), and Tg and Tc were determined from the DTA curve obtained. The results are shown in Table 1.

(3) Measurement of Ion Conductivity

A gold electrode (diameter: 6 mm) was formed by a vapor deposition method on both surfaces of the glass flake obtained in each Ex. Subsequently, a measurement voltage of 50 mV was applied to the gold electrodes, and the impedance of the glass flake was measured by an AC impedance method. In the measurement, Solartron SI 1287 (manufactured by Solartron) provided with FRA (frequency response analyzer) was used, and the measurement frequency was set to be from 1 Hz to 1 MHz. The ion conductivity was determined from an arc diameter obtained in the Nyquist plot. The ion conductivity measured using the glass flake is the same as the ion conductivity of glass frits 1 to 3.

TABLE 1

|  |  |  | Ex. 1 | Ex. 2 | Ex. 3 |
|---|---|---|---|---|---|
| Composition | Cation % | Li⁺ | 58.8 | 54.9 | 59.9 |
|  |  | B³⁺ | 41.2 | 45.1 | 40.1 |
|  | Anion % | O²⁻ | 82.4 | 96.6 | 92.9 |
|  |  | Cl⁻ | 17.6 | 3.4 | 7.1 |
| Physical properties of glass frit | $D_{50}$ [μm] |  | 0.8 | 1.0 | 0.9 |
|  | Tg [° C.] |  | 341 | 366 | 310 |
|  | Tc [° C.] |  | 431 | 428 | 395 |
|  | Ion conductivity [S/cm] |  | $6.0 \times 10^{-6}$ | $1.0 \times 10^{-6}$ | $1.1 \times 10^{-6}$ |

Exs. 4 to 6

The glass flake of each Ex. obtained above (in Table 2, indicated by the glass frit No.) was heat-treated at a temperature and time shown in Table 2 to produce the crystallized glasses of Exs. 4 to 6. The heat treatment temperature was equal to or higher than Tg and equal to or lower than Tc of the glass of each Ex.

(Evaluation of Crystallized Glass)

(1) X-Ray Diffraction Pattern

After the flaky crystallized glass obtained above was crushed, a powder X-ray diffraction pattern using Cu-Kα radiation was measured by means of an X-ray diffractometer (trade name: SmartLab, manufactured by Rigaku Corporation), and the presence or absence of a diffraction peak in each range of $2\theta=22.8\pm0.5°$, $2\theta=32.1\pm0.5°$ and $2\theta=39.6\pm0.5°$ was confirmed by means of an integrated powder X-ray analysis software, PDXL (produced by Rigaku Corporation). Furthermore, the ratio of the intensity of a diffraction peak attributed to (111) plane of LiX (wherein in each Ex., X is Cl) to the highest intensity among those three diffraction peaks was calculated.

Figure 2:
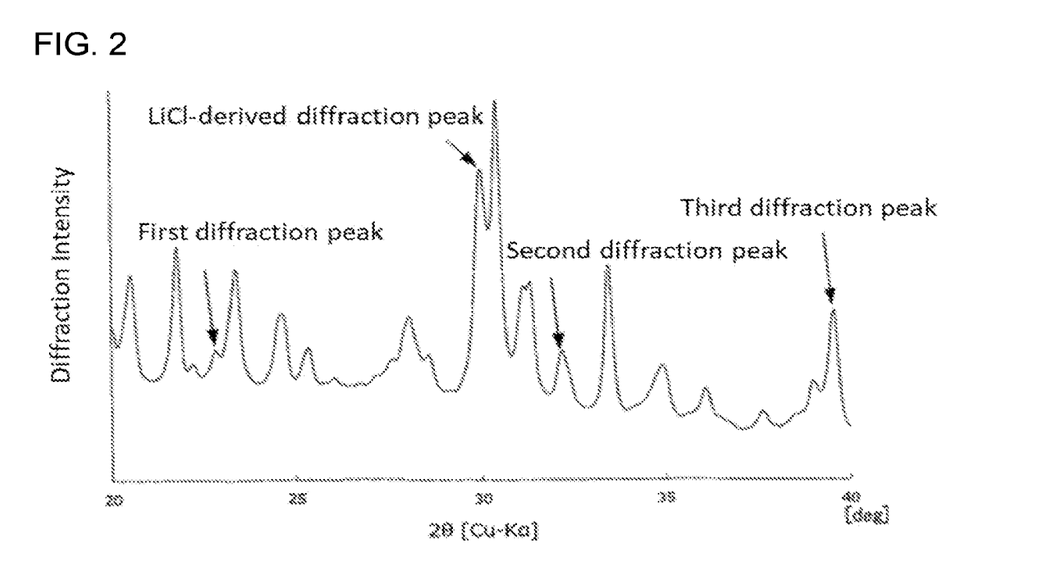
FIG. 2 is a diagram illustrating a powder X-ray diffraction pattern of the crystallized glass obtained in Ex. 4.

The results are shown in Table 2. In Table 2, the diffraction peak present at $2\theta=22.8\pm0.5°$, the diffraction peak present at $2\theta=32.1\pm0.5°$, and the diffraction peak present at $2\theta=39.6\pm0.5°$ are shown as "first diffraction peak", "second diffraction peak", and "third diffraction peak", respectively. The results are indicated by the peak value (°) when a diffraction peak is present in the first to third diffraction peaks, and indicated by "none" when a diffraction peak is not present. The ratio of the intensity of a diffraction peak (2θ=30.1°) attributed to (111) plane of LiCi to the highest intensity among first to third diffraction peaks is shown as "$I_{LiX}/I_{max(1-3)}$" in Table 2. In this case, when a diffraction peak is not present, the ratio is indicated by "–". FIG. 2 illustrates a powder X-ray diffraction pattern of the crystallized glass of Ex. 4 obtained from the glass frit (glass flake) of Ex. 1.

(2) Measurement of Ion Conductivity

With respect to the flaky crystallized glasses obtained, the ion conductivity was measured by the same method as above. The results are shown in Table 2.

TABLE 2

|  |  | Ex. 4 | Ex. 5 | Ex. 6 |
|---|---|---|---|---|
|  | Glass frit No. | Ex. 1 | Ex. 2 | Ex. 3 |
| Manufacturing conditions | Heat treatment temperature (° C.) | 380 | 380 | 335 |
|  | Heat treatment time (min) | 15 | 15 | 15 |
| X-Ray diffraction | First diffraction peak (°) | 22.8 | none | none |
|  | Second diffraction peak (°) | 32.1 | none | none |
|  | Third diffraction peak (°) | 39.6 | none | none |
|  | $I_{LiX}/I_{max(1-3)}$ | 1.9 | — | — |
| Ion conductivity [S/cm] |  | $9.0 \times 10^{-6}$ | $1.0 \times 10^{-7}$ or less | $9.6 \times 10^{-7}$ |

As seen from Table 1 and Table 2, the crystallized glass of Ex. 4 obtained by heat-treating the glass frit of Ex. 1 exhibits a high ion conductivity, whereas the crystallized glasses of Exs. 5 and 6 obtained by heat-treating the glass frits of Exs. 2 and 3 exhibit a low conductivity. In addition, it was confirmed from the X-ray diffraction pattern that the crystalline phase of the crystallized glass obtained from the glass frit of Ex. 1 has an anti perovskite structure.

INDUSTRIAL APPLICABILITY

Use of the glass frit of the present invention enables obtaining the crystallized glass of the present invention which is inflammable, allows high safety, has high stability against voltage application, and achieves excellent ion conductivity. When a solid electrolyte containing this crystallized glass is used, a lithium ion secondary battery being safe and achieving high stability against voltage application and high battery performance can be realized.

REFERENCE SIGNS LIST

10: Lithium ion secondary battery, 11: positive electrode (cathode electrode), 12: negative electrode (anode electrode), 13: solid electrolyte layer, 14: laminate unit, and 15: electron conductor layer.

The invention claimed is:

1. A glass frit, comprising
a glass having a composition comprising Li, at least one selected from the group consisting of B, Si, and Ge, O, and at least one selected from the group consisting of F, Cl, Br, and I,
wherein the glass comprises, by cation %, from 50% to 75% of $Li^+$ and from 25% to 50% of at least one selected from the group consisting of $B^{3+}$, $Si^{4+}$, and $Ge^{4+}$, and by anion %, from 70% to 92% of $O^{2-}$ and from 8% to 30% of at least one selected from the group consisting of $F^-$, $Cl^-$, $Br^-$ and $I^-$, and upon a heat treatment of the glass at a temperature in a range of a glass transition temperature of the glass to a glass crystallization temperature of the glass, a crystallized glass comprising an amorphous phase and a crystalline phase having an anti perovskite structure is formed, the crystalline phase precipitated by the heat treatment, and the crystallized glass has diffraction peaks at $2\theta=22.8\pm0.5°$, $2\theta=32.1\pm0.5°$ and $2\theta=39.6\pm0.5°$ in a powder X-ray diffraction pattern using Cu-Kα radiation.

2. The glass frit according to claim 1, wherein in the powder X-ray diffraction pattern, an intensity of a diffraction peak attributed to a (111) plane of LiX, where X is at least one selected from the group consisting of F, Cl, Br and I is at most 5 times an intensity of a highest intensity among the diffraction peaks a $2\theta=22.8\pm0.5°$, $2\theta=32.1\pm0.5°$ and $2\theta=39.6\pm0.5°$.

3. The glass frit according to claim 1, wherein the crystalline phase comprises $Li_3OX$, where X is at least one selected from the group consisting of F, Cl, Br and I.

4. The glass frit according to claim 1, wherein the glass further comprises:
at least one selected from the group consisting of Mg, Ca, Sr and Ba,
wherein the crystalline phase comprises $Li_3OX$ and/or $Li_{3-2y}M_yOX$, where X is at least one selected from the group consisting of F, Cl, Br and I, M is at least one selected from the group consisting of Mg, Ca, Sr and Ba, and y is a positive number in a range of 0.001 to 0.02.

5. The glass frit according to claim 4, wherein a content of the at least one selected from the group consisting of Mg, Ca, Sr and Ba in the glass is, as represented by cation %, in a range of 0.0005% to 0.02%.

6. The glass frit according to claim 1, wherein, denoting as $D_{50}$ a 50% particle diameter on a volume basis in a cumulative particle size distribution, the glass frit has a $D_{50}$ in a range of 0.01 μm to 20 μm.

7. A crystallized glass, comprising:
a. crystallized glass composition comprising an amorphous phase and a crystalline phase,
wherein the crystallized glass composition comprises Li, at least one selected from the group consisting of B, Si, and Ge, O, and at least one selected from the group consisting of F, Cl, Br and I, and having diffraction peaks at $2\theta=22.8\pm0.5°$, $2\theta=32.1\pm0.5°$ and $2\theta=39.6\pm0.5°$ in a powder X-ray diffraction pattern using Cu-Kα radiation, the crystalline phase has an anti perovskite structure, and the crystalline glass composition comprises, by cation %, from 50% to 75% of $Li^+$ and from 25% to 50% of at least one selected from the group consisting of $B^{3+}$, $Si^{4+}$, and $Ge^{4+}$, and by anion %, from 70% to 92% of $O^{2-}$ and from 8% to 30% of at least one selected from the group consisting of $F^-$, $Cl^-$, $Br^-$ and $I^-$.

8. The crystallized glass according to claim 7, wherein in the powder X-ray diffraction pattern, an intensity of a diffraction peak attributed to a (111) plane of LiX, where X is at least one selected from the group consisting of F, Cl, Br and I, is at most 5 times an intensity of the highest intensity among the diffraction peaks at $2\theta=22.8\pm0.5°$, $2\theta=32.1\pm0.5°$ and $2\theta=39.6\pm0.5°$.

9. The crystallized glass according to claim 7, wherein the crystalline phase comprises $Li_3OX$, where X is at least one selected from the group consisting of F, Cl, Br and I.

10. The crystallized glass according to claim 7, wherein a volume fraction of the crystalline phase in the crystallized glass is in a rage of 10 vol % to 95 vol %.

11. The crystallized glass according to claim 7, further comprising:
at least one selected from the group consisting of Mg, Ca, Sr and Ba,
wherein the crystalline phase comprises $Li_3OX$ and/or $Li_{3-2y}M_yOX$, where X is at least one selected from the group consisting of F, Cl, Br and I, M is at least one selected from the group consisting of Mg, Ca, Sr and Ba, and y is a positive number in a range of 0.001 to and 0.02 less.

12. The crystallized glass according to claim 11, wherein a content of the at least one selected from the group consisting of Mg, Ca, Sr and Ba is, as represented by cation %, from 0.0005% to 0.02%.

13. The crystallized glass according to claim 7, wherein the crystallized glass is in frit form, and denoting as $D_{50}$ a 50% particle diameter on a volume basis in a cumulative particle size distribution, $D_{50}$ is in a range 0.01 μm to 20 μm.

14. A method for producing the crystallized glass according to claim 7, comprising:
dissolving a raw material composition comprising components of the crystallized glass, at a temperature of from 800° C. to 1,100° C. followed by rapidly cooling to obtain a crystallized glass precursor; and heat-treating the crystallized glass precursor in an inert gas atmosphere or dry atmosphere at a temperature of from 200° C. to 500° C. for from 5 minutes to 1 hour, wherein the dry atmosphere indicates an atmosphere having a dew point value of −50° C. or less.

15. The method 4 according to claim 14, wherein the inert gas is at least one selected from the group consisting of nitrogen, argon and helium, and an oxygen concentration in the dry atmosphere is in a range of 0.1 vol % to 100 vol %.

16. The method according to claim 14, wherein the raw material composition and/or the crystallized glass precursor comprises a seed crystal.

17. The production method according to claim 16, wherein the seed crystal has an anti perovskite structure.

18. The method according to claim 16, wherein the seed crystal comprises $Li_3OX$, where X is at least one selected from the group consisting of K Cl, Br and I.

19. A solid electrolyte comprising the crystallized glass according to claim 7.

20. A lithium ion secondary battery, comprising:
a positive electrode, a negative electrode, and a solid electrolyte layer disposed between the positive electrode and the negative electrode,
wherein the solid electrolyte layer comprises the solid electrolyte of claim 19.

* * * * *